US008694162B2

(12) United States Patent
Jaynes

(10) Patent No.: US 8,694,162 B2
(45) Date of Patent: Apr. 8, 2014

(54) METHODS, APPARATUSES AND COMPUTER PROGRAM PRODUCTS FOR UTILIZING NEAR FIELD COMMUNICATION TO GUIDE ROBOTS

(75) Inventor: Robert Jaynes, Mars, PA (US)

(73) Assignee: McKesson Automation, Inc., Cranberry, PA (US)

( * ) Notice: Subject to any disclaimer, the term of this patent is extended or adjusted under 35 U.S.C. 154(b) by 581 days.

(21) Appl. No.: 12/973,551

(22) Filed: Dec. 20, 2010

(65) Prior Publication Data

US 2012/0158235 A1 Jun. 21, 2012

(51) Int. Cl.
G05B 19/04 (2006.01)
G06F 7/00 (2006.01)

(52) U.S. Cl.
USPC ........... 700/257; 700/214; 700/215; 700/224; 700/225; 700/226; 700/227

(58) Field of Classification Search
None
See application file for complete search history.

(56) References Cited

U.S. PATENT DOCUMENTS

| | | |
|---|---|---|
| 4,717,042 A | 1/1988 | McLaughlin |
| 4,785,969 A | 11/1988 | McLaughlin |
| 4,847,764 A | 7/1989 | Halvorson |
| 5,014,875 A | 5/1991 | McLaughlin et al. |
| 5,190,185 A | 3/1993 | Blechl |
| 5,314,243 A | 5/1994 | McDonald et al. |
| 5,346,297 A | 9/1994 | Colson, Jr. et al. |
| 5,377,864 A | 1/1995 | Blechl et al. |
| 5,405,048 A | 4/1995 | Rogers et al. |
| 5,431,299 A | 7/1995 | Brewer et al. |
| 5,460,294 A | 10/1995 | Williams |
| 5,468,110 A | 11/1995 | McDonald et al. |
| 5,480,062 A | 1/1996 | Rogers et al. |
| 5,520,450 A | 5/1996 | Colson, Jr. et al. |
| 5,564,803 A | 10/1996 | McDonald et al. |
| 5,593,267 A | 1/1997 | McDonald et al. |
| 5,661,978 A | 9/1997 | Holmes et al. |
| D384,578 S | 10/1997 | Wangu et al. |
| 5,713,485 A | 2/1998 | Liff et al. |
| 5,716,114 A | 2/1998 | Holmes et al. |
| 5,745,366 A | 4/1998 | Higham et al. |
| 5,761,877 A | 6/1998 | Quandt |
| 5,797,515 A | 8/1998 | Liff et al. |
| 5,805,456 A | 9/1998 | Higham et al. |
| 5,842,976 A | 12/1998 | Williamson |
| 5,878,885 A | 3/1999 | Wangu et al. |
| 5,880,443 A | 3/1999 | McDonald et al. |
| 5,883,806 A | 3/1999 | Meador et al. |
| 5,893,697 A | 4/1999 | Zini et al. |
| 5,905,653 A | 5/1999 | Higham et al. |

(Continued)

*Primary Examiner* — Khoi Tran
*Assistant Examiner* — Robert Nguyen
(74) *Attorney, Agent, or Firm* — Alston & Bird LLP

(57) ABSTRACT

An apparatus is provided for determining a path or route in which a robot may be guided to perform a task(s) and avoiding one or more obstacles or obstructions. The apparatus includes at least one memory and at least one processor configured to receive origin location information via a Near Field Communication (NFC) tag associated with a key in an instance in which the key is positioned in an origin location. The processor is also configured to receive target location information via the NFC tag associated with the key in an instance in which the key is positioned in a target location, at which a task is performed by a robot and may generate a route for the robot to traverse in order to complete the task based in part on the origin location information and the target location information. Corresponding computer program products and methods are also provided.

20 Claims, 8 Drawing Sheets

(56) References Cited

U.S. PATENT DOCUMENTS

| | | |
|---|---|---|
| 5,912,818 A | 6/1999 | McGrady et al. |
| 5,927,540 A | 7/1999 | Godlewski |
| 5,940,306 A | 8/1999 | Gardner et al. |
| 5,971,593 A | 10/1999 | McGrady |
| 6,003,006 A | 12/1999 | Colella et al. |
| 6,011,999 A | 1/2000 | Holmes |
| 6,021,392 A | 2/2000 | Lester et al. |
| 6,039,467 A | 3/2000 | Holmes |
| 6,065,819 A | 5/2000 | Holmes et al. |
| 6,068,156 A | 5/2000 | Liff et al. |
| 6,109,774 A | 8/2000 | Holmes et al. |
| 6,112,502 A | 9/2000 | Frederick et al. |
| 6,116,461 A | 9/2000 | Broadfield et al. |
| 6,151,536 A | 11/2000 | Arnold et al. |
| 6,170,230 B1 | 1/2001 | Chudy et al. |
| 6,176,392 B1 | 1/2001 | William et al. |
| 6,189,727 B1 | 2/2001 | Shoenfeld |
| 6,223,934 B1 | 5/2001 | Shoenfeld |
| 6,256,967 B1 | 7/2001 | Hebron et al. |
| 6,283,322 B1 | 9/2001 | Liff et al. |
| 6,289,656 B1 | 9/2001 | Wangu et al. |
| 6,338,007 B1 | 1/2002 | Broadfield et al. |
| 6,339,732 B1 | 1/2002 | Phoon et al. |
| 6,361,263 B1 | 3/2002 | Dewey et al. |
| 6,370,841 B1 | 4/2002 | Chudy et al. |
| 6,449,927 B2 | 9/2002 | Hebron et al. |
| 6,471,089 B2 | 10/2002 | Liff et al. |
| 6,497,342 B2 | 12/2002 | Zhang et al. |
| 6,499,270 B2 | 12/2002 | Peroni et al. |
| 6,532,399 B2 | 3/2003 | Mase |
| 6,564,121 B1 | 5/2003 | Wallace et al. |
| 6,581,798 B2 | 6/2003 | Liff et al. |
| 6,609,047 B1 | 8/2003 | Lipps |
| 6,611,733 B1 | 8/2003 | De La Huerga |
| 6,625,952 B1 | 9/2003 | Chudy et al. |
| 6,640,159 B2 | 10/2003 | Holmes et al. |
| 6,650,964 B2 | 11/2003 | Spano, Jr. et al. |
| 6,671,579 B2 | 12/2003 | Spano, Jr. et al. |
| 6,681,149 B2 | 1/2004 | William et al. |
| 6,742,671 B2 | 6/2004 | Hebron et al. |
| 6,755,931 B2 | 6/2004 | Vollm et al. |
| 6,760,643 B2 | 7/2004 | Lipps |
| 6,776,304 B2 | 8/2004 | Liff et al. |
| 6,785,589 B2 | 8/2004 | Eggenberger et al. |
| 6,790,198 B1 | 9/2004 | White et al. |
| 6,814,254 B2 | 11/2004 | Liff et al. |
| 6,814,255 B2 | 11/2004 | Liff et al. |
| 6,847,861 B2 | 1/2005 | Lunak et al. |
| 6,874,684 B1 | 4/2005 | Denenberg et al. |
| 6,892,780 B2 | 5/2005 | Vollm et al. |
| 6,895,304 B2 | 5/2005 | Spano, Jr. et al. |
| 6,975,922 B2 | 12/2005 | Duncan et al. |
| 6,985,797 B2 | 1/2006 | Spano, Jr. et al. |
| 6,996,455 B2 | 2/2006 | Eggenberger et al. |
| 6,996,456 B2 | 2/2006 | Cordell et al. |
| 7,010,389 B2 | 3/2006 | Lunak et al. |
| 7,014,063 B2 | 3/2006 | Shows et al. |
| 7,016,766 B2 | 3/2006 | William et al. |
| 7,040,504 B2 | 5/2006 | Broadfield et al. |
| 7,052,097 B2 | 5/2006 | Meek, Jr. et al. |
| 7,072,737 B2 | 7/2006 | Lunak et al. |
| 7,072,855 B1 | 7/2006 | Godlewski et al. |
| 7,077,286 B2 | 7/2006 | Shows et al. |
| 7,085,621 B2 | 8/2006 | Spano, Jr. et al. |
| 7,092,796 B2 | 8/2006 | Vanderveen |
| 7,093,755 B2 | 8/2006 | Jordan et al. |
| 7,100,792 B2 | 9/2006 | Hunter et al. |
| 7,103,419 B2 | 9/2006 | Engleson et al. |
| 7,111,780 B2 | 9/2006 | Broussard et al. |
| 7,139,639 B2 | 11/2006 | Broussard et al. |
| 7,150,724 B2 | 12/2006 | Morris et al. |
| 7,171,277 B2 | 1/2007 | Engleson et al. |
| 7,218,231 B2 | 5/2007 | Higham |
| 7,228,198 B2 | 6/2007 | Vollm et al. |
| 7,249,688 B2 | 7/2007 | Hunter et al. |
| 7,348,884 B2 | 3/2008 | Higham |
| 7,417,729 B2 | 8/2008 | Greenwald |
| 7,419,133 B2 | 9/2008 | Clarke et al. |
| 7,426,425 B2 | 9/2008 | Meek, Jr. et al. |
| 7,554,449 B2 | 6/2009 | Higham |
| 7,571,024 B2 | 8/2009 | Duncan et al. |
| 7,588,167 B2 | 9/2009 | Hunter et al. |
| 2005/0055127 A1* | 3/2005 | Swain et al. ............ 700/186 |
| 2006/0293794 A1* | 12/2006 | Harwig et al. ............ 700/253 |
| 2007/0061041 A1* | 3/2007 | Zweig ............ 700/245 |
| 2007/0065259 A1* | 3/2007 | Talley ............ 414/279 |
| 2008/0039974 A1* | 2/2008 | Sandin et al. ............ 700/258 |
| 2008/0224867 A1* | 9/2008 | Rehman ............ 340/572.1 |
| 2009/0030551 A1* | 1/2009 | Hein et al. ............ 700/253 |
| 2009/0319077 A1* | 12/2009 | Cameron ............ 700/173 |
| 2010/0114372 A1* | 5/2010 | Knuth et al. ............ 700/257 |
| 2010/0241273 A1* | 9/2010 | Ko ............ 700/245 |
| 2012/0029697 A1* | 2/2012 | Ota et al. ............ 700/253 |
| 2012/0072023 A1* | 3/2012 | Ota ............ 700/259 |
| 2012/0283867 A1* | 11/2012 | Gelbman et al. ............ 700/215 |

\* cited by examiner

METHODS, APPARATUSES AND COMPUTER PROGRAM PRODUCTS FOR UTILIZING NEAR FIELD COMMUNICATION TO GUIDE ROBOTS

TECHNOLOGICAL FIELD

Exemplary embodiments of the present invention relate generally to a mechanism for more efficiently and reliably teaching an automated or semi-automated machine or apparatus (referred to as a "robot" or "robot element") one or more locations for accessing and performing one or more tasks and/or one or more areas or locations to avoid and, more particularly, relate to a method, apparatus and computer program product for reducing the likelihood of that robot colliding with structures in an automated environment.

BACKGROUND

Currently, usage of automated or semi-automated machines or apparatuses ("robots") (e.g., x-y tables, articulated robots, beam robotics, single axis, multi-axis, motor driven machinery, etc.), referred to as "robots," can increase productivity and performance, and save costs in many environments. In this regard, robots typically can perform tasks or applications with greater accuracy, precision and consistency than manual or non-automated approaches. These increases in accuracy, precision and consistency may result in quality improvements. Robots typically have the ability to interact with one or more tangible objects and may be programmed to perform specific tasks or actions. Some modern robots may be fixed in place or capable of moving around in their environment to access areas of interest and interact with tangible objects to perform automated tasks. Many of the areas of interest that a robot accesses may be situated in a tightly controlled environment. For example, a robot (e.g., an automation arm) utilized in an automotive factory may need to access one or more locations for performing a weld or installing components of a vehicle in a tightly controlled area such as, for example, an assembly line.

In many instances, robots will need to be taught the manner in which to access areas of interest (also referred to herein as a target(s)) to perform one or more tasks in order to complete a work cycle for an environment. Currently, teaching a robot a manner in which to access one or more targets typically involves an operator manually guiding the robot to particular locations and recording values associated with the locations. For example, in an automotive environment, the operator may need to utilize a control pad to manually input data to guide the robot to a weld location and utilize a device to record data indicating the weld location such that the robot may know the location in which to perform a weld on a vehicle at some future time. Additionally, the operator may need to utilize the control pad to manually input data to guide the robot to a paint location and may utilize a device to record data indicating the paint location such that the robot may know the location to access in order to paint a portion of a vehicle at some future time. Also, the operator may need to utilize the control pad to manually guide the robot to an assembly location and utilize a device to record data indicating the assembly location such that the robot may know the location to access in the future in order to assemble a component(s) of a vehicle. This process may continue until a work cycle for the robot is completed.

One drawback of this approach involving the operator manually inputting data to a control pad to guide the robot to targets is that it can be a laborious, burdensome and time consuming process, since the operator may have to teach the robot the manner in which to access multiple targets for completion of a work cycle. For example, in some environments, a robot may be assigned 21 different targets at which to perform one or more different tasks, and teaching a robot these positions may take a large amount of time.

Additionally, it should be pointed out that guiding a robot to targets can require a high level of accuracy to avoid inadvertent collisions with other structures. At present, an operator may rely on his/her sight to visually guide the robot to targets with the aim of avoiding collisions. However, relying on the sight of the operator may be imprecise, and there may be instances in which the operator may be unable to manually guide the robot to targets without the robot colliding with other structures such as, for example, in areas of high congestion. As such, expensive equipment may be damaged.

As described above, in some instances, an operator may utilize a control pad to manually input data in order to guide a robot to targets and the control pad may receive feedback from a sensor (e.g., a switch) indicating that the locations corresponding to targets are nearby. While using the sensors to provide feedback to indicate when the location of a target is nearby may be of some assistance to the operator, the feedback from the sensors still may be ineffective in instances in which a high level of precision is required. For instance, in tight or congested areas the sensors may not provide the level of accuracy needed to identify the location of a target. As such, a robot still may run the risk of colliding with structures. Additionally, providing sensor feedback to a control pad to indicate to the operator whether a location of a target is nearby typically does not solve the problem associated with manually teaching the robot the locations of the targets, since the operator may still need to utilize the control pad to manually guide the robot to locations corresponding to targets.

In view of the foregoing drawbacks, it may be desirable to provide an efficient and reliable mechanism in which to teach a robot the location of targets for performing tasks. Additionally, in view of the above drawbacks, it may be beneficial to provide a mechanism for minimizing the likelihood of the robot colliding with one or more structures in an automated environment.

BRIEF SUMMARY

A method, apparatus and computer program product are therefore provided that enable provision of determining a route based on received location information in which the route specifies a path that a robot is to travel for performing one or more tasks at determined locations. As used herein, "robot" refers to all or part of (e.g., an arm of) an automated or semi-automated machine or apparatus that can be used in any industry including, but not limited to, for example, the automotive industry, the medication dispensing industry, and/or any industry in which a robot may be used to complete one or more tasks in an automated environment. The determined locations may correspond to locations of Near Field Communication (NFC) devices. By utilizing the exemplary embodiments, a robot may be taught targets to access along a route without manually guiding the robot to each target location in advance of generating the route.

In this regard, the exemplary embodiments may facilitate receipt of NFC data (e.g., radio frequency identification (RFID) data) from one or more NFC tags (e.g., RFID tags) at one or more targets. The NFC data received from the NFC tags at the targets may be utilized to determine the corresponding location of each target. In this regard, location data associated with the determined locations of the targets may be utilized in part to generate a route in which a robot is to travel along a path to access areas associated with the targets.

In some embodiments the determined location data may be utilized to determine one or more areas, locations or objects that the robot is to avoid along the route. The determined route may be provided to the robot along with data instructing the robot to move about an environment in the manner specified by the route.

In one example embodiment, a method for determining a path or route in which a robot may be guided to perform one or more tasks is provided. The method may include receiving origin location information via a NFC tag associated with a key in an instance in which the key is positioned in an origin location. The method may further include receiving target location information via the NFC tag associated with the key in an instance in which the key is positioned in a target location, at which a task is performed by a robot. The method may further include generating a route for the robot to traverse in order to complete the task based in part on the origin location information and the target location information.

In another example embodiment, an apparatus for determining a path or route in which a robot may be guided to perform one or more tasks is provided. The apparatus may include at least one memory and at least one processor configured to cause the apparatus to receive origin location information via a NFC tag associated with a key in an instance in which the key is positioned in an origin location. The processor may further cause the apparatus to receive target location information via the NFC tag associated with the key in an instance in which the key is positioned in a target location, at which a task is performed by a robot. The processor may further cause the apparatus to generate a route for the robot to traverse in order to complete the task based in part on the origin location information and the target location information.

In another example embodiment, a computer program product for determining a path or route in which a robot may be guided to perform one or more tasks is provided. The computer program product includes at least one computer-readable storage medium having computer-executable program code instructions stored therein. The computer-executable program code instructions may include program code instructions configured to cause receipt of origin location information via a NFC tag associated with a key in an instance in which the key is positioned in an origin location. The program code instructions may also cause receipt of target location information via the NFC tag associated with the key in an instance in which the key is positioned in a target location, at which a task is performed by a robot. The program code instructions may also generate a route for the robot to traverse in order to complete the task based in part on the origin location information and the target location information.

Embodiments of the invention may provide a method, apparatus and computer program product for providing an efficient and reliable manner in which to teach a robot one or positions or locations for accessing targets along a route. As a result, device users such as operators may enjoy improvements with respect to teaching a robot the manner in which to acquire robot target locations or areas for the robot to avoid.

BRIEF DESCRIPTION OF THE SEVERAL VIEWS OF THE DRAWINGS

Figure 1:
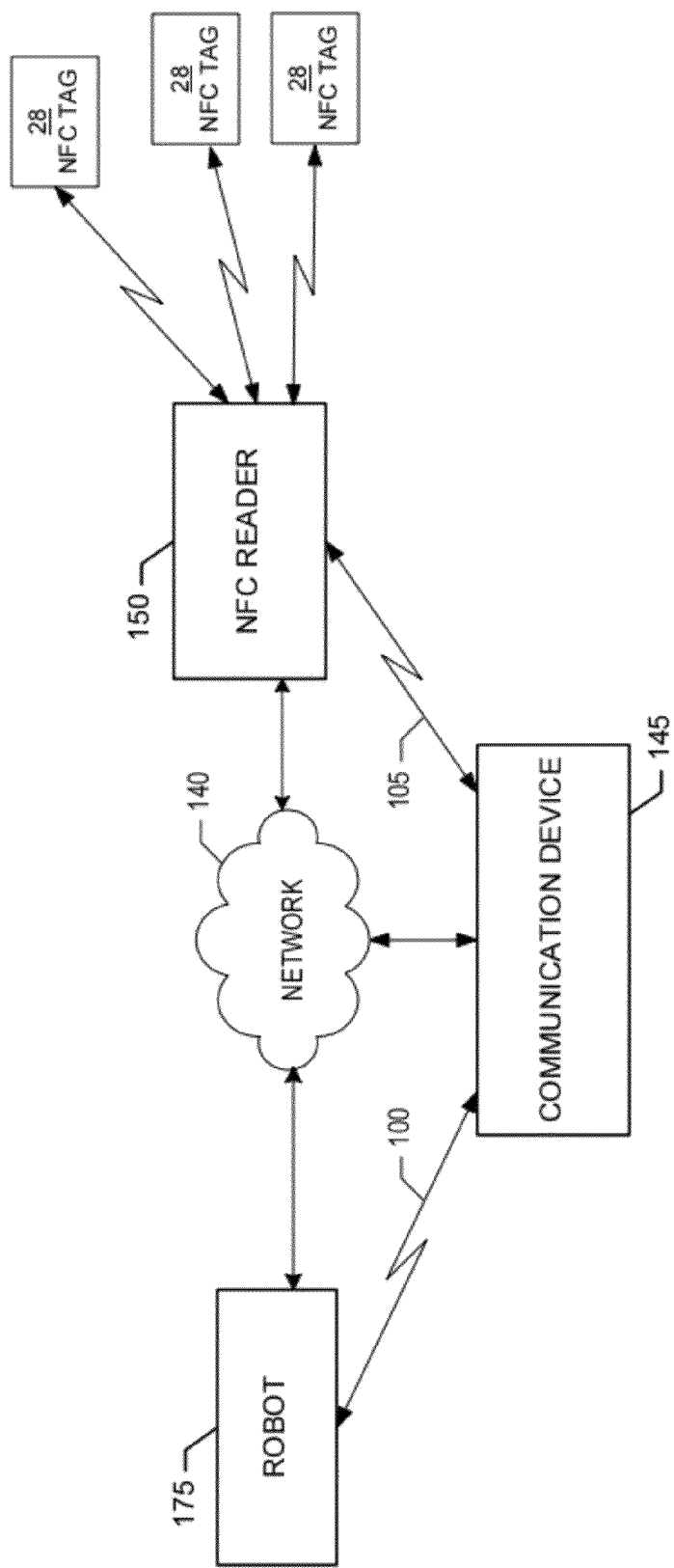
Figure 2:
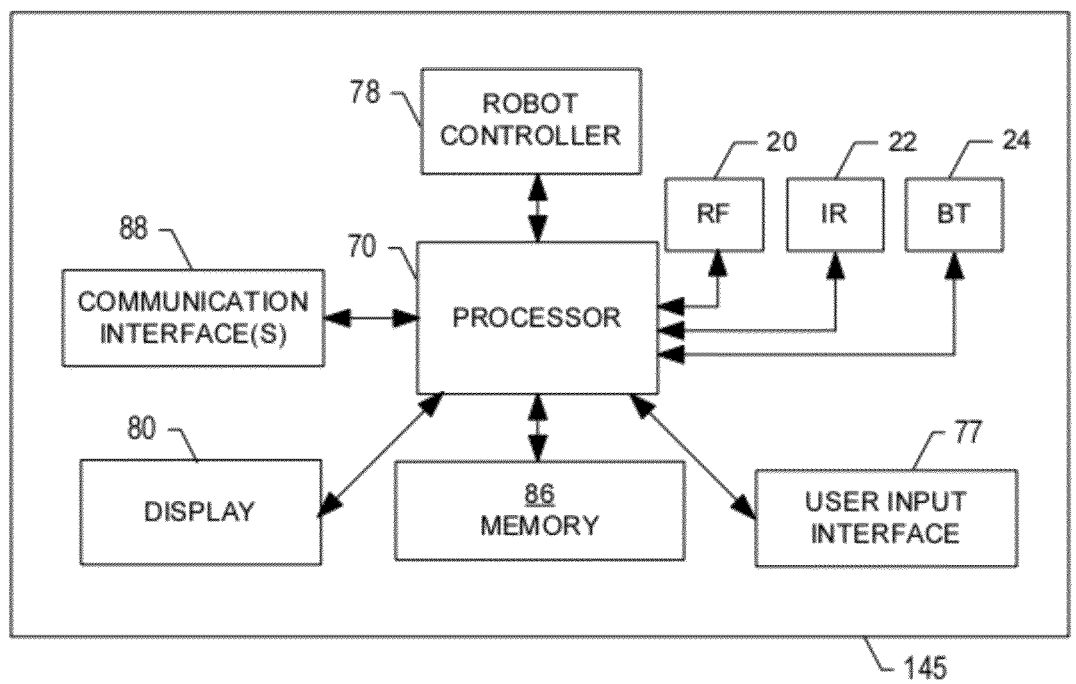
Figure 3:
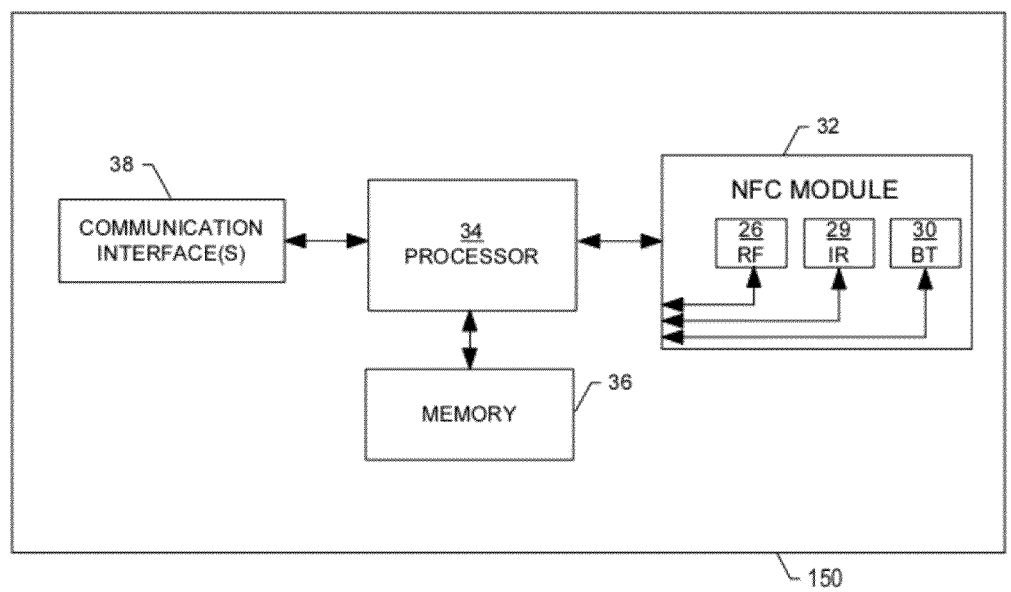
Figure 4:
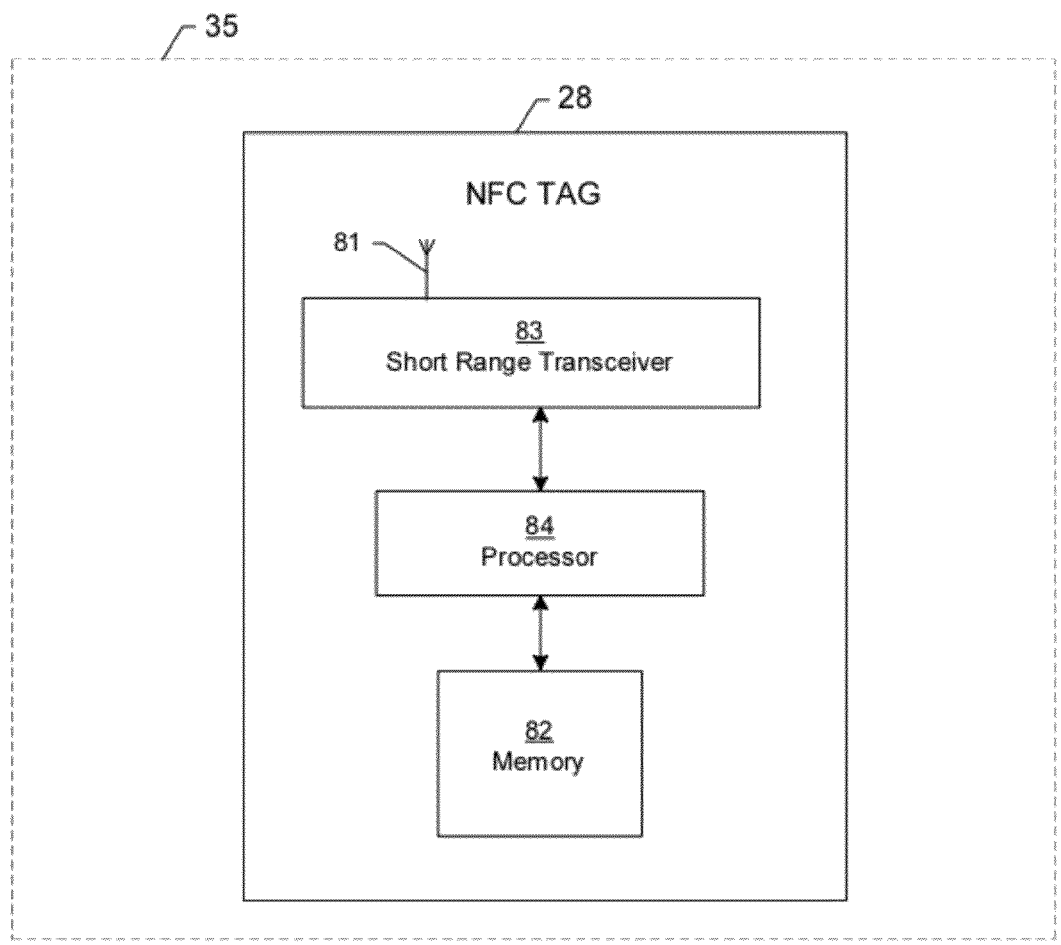
Figure 5:
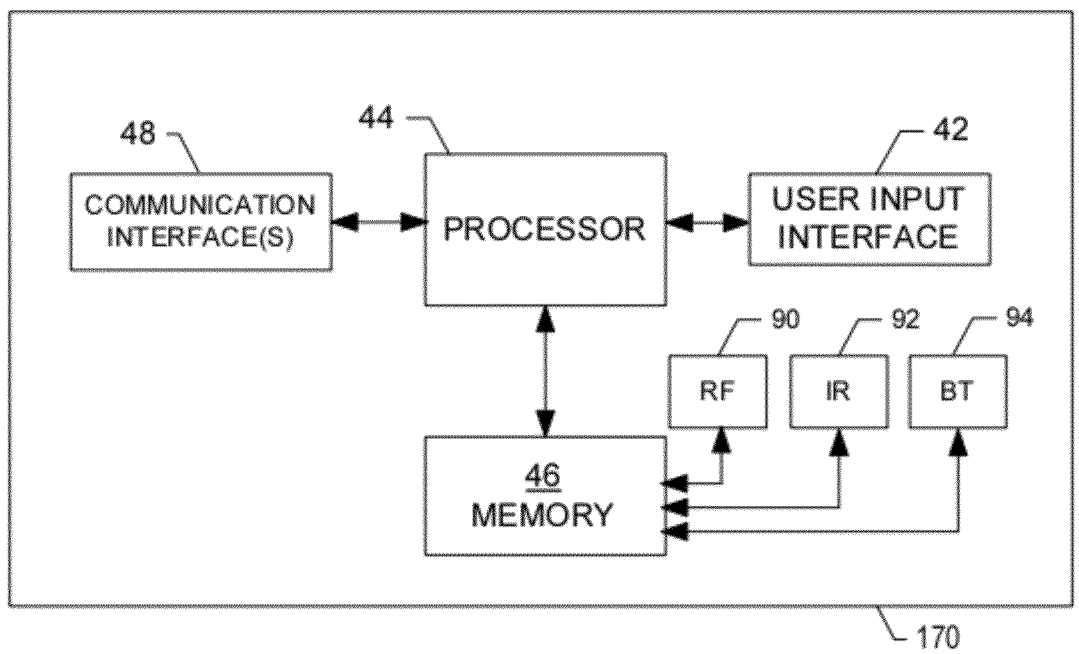
Figure 6:
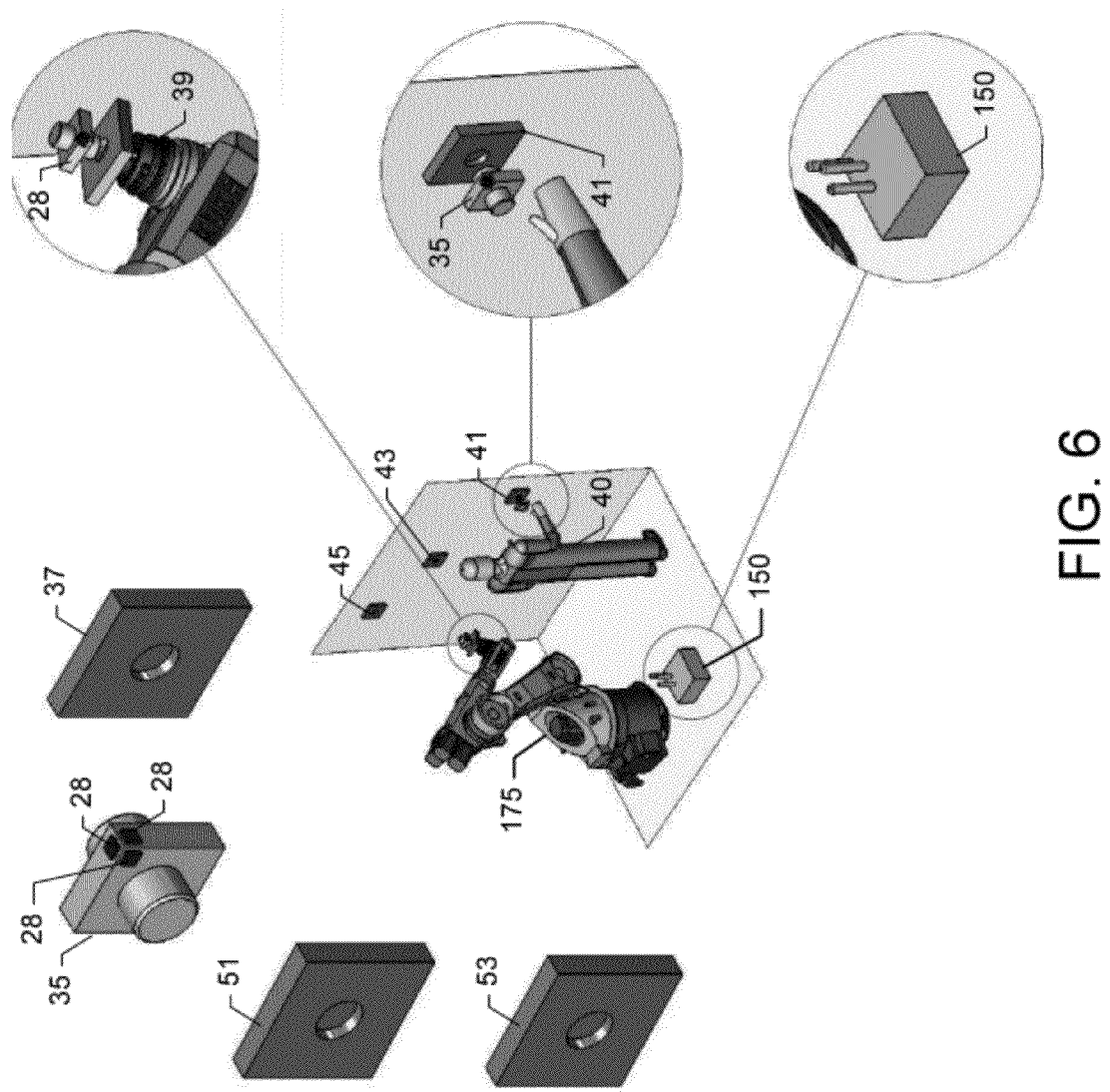
Figure 7:
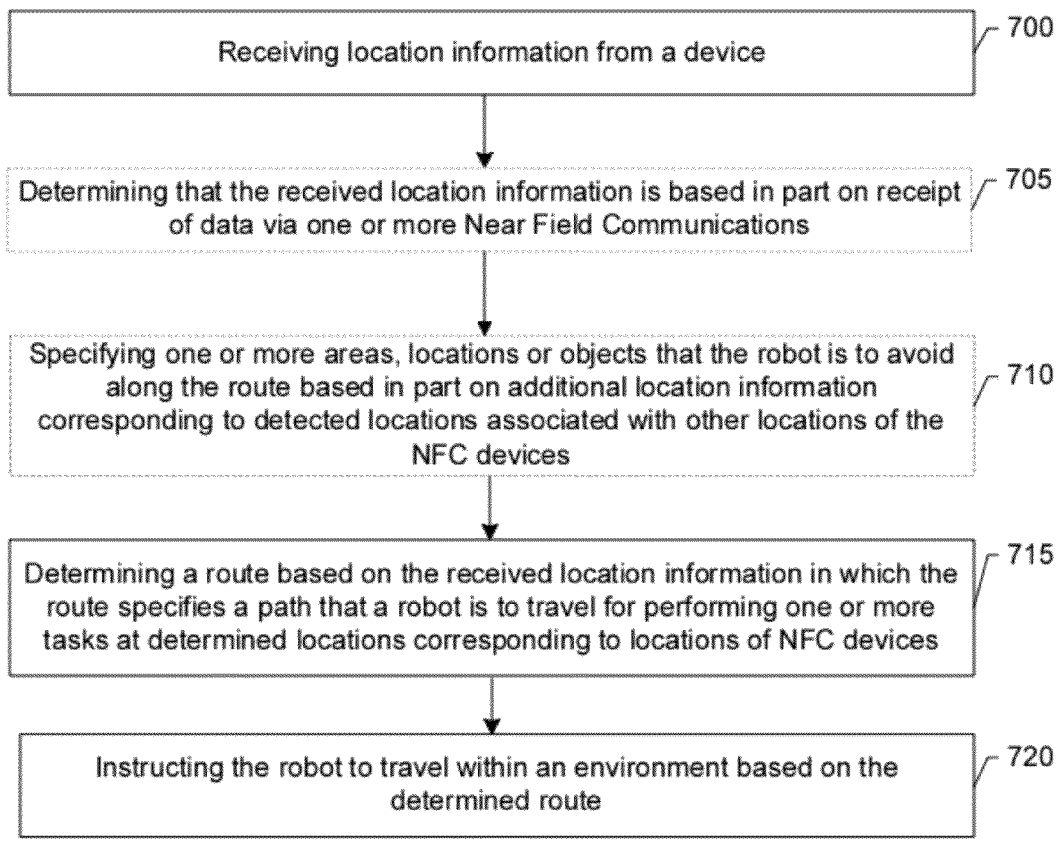
Figure 8:
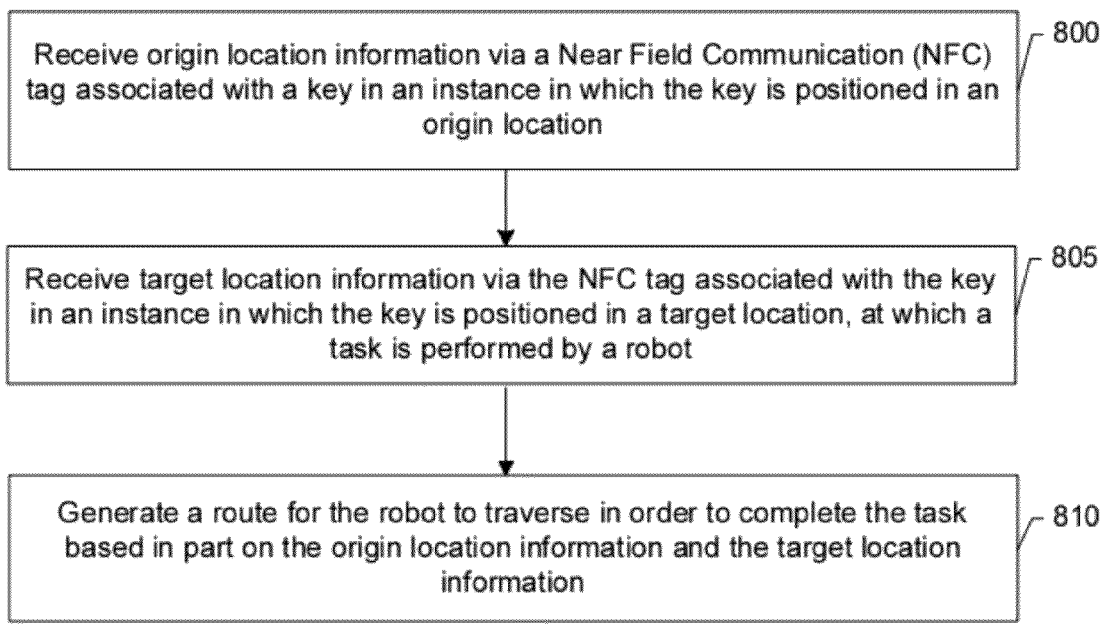

Having thus described the invention in general terms, reference will now be made to the accompanying drawings, which are not necessarily drawn to scale, and wherein:

FIG. 1 is a schematic block diagram of a system according to an exemplary embodiment of the invention;

FIG. 2 is a schematic block diagram of a communication device according to an exemplary embodiment of the invention;

FIG. 3 is a schematic block diagram of a NFC reader according to an exemplary embodiment of the invention;

FIG. 4 is a schematic block diagram of a NFC tag according to an exemplary embodiment of the invention;

FIG. 5 is a schematic block diagram of a computing device according to an exemplary embodiment of the invention;

FIG. 6 is a diagram of a system according to an exemplary embodiment of the invention;

FIG. 7 is a flowchart of a method for determining a route in which a robot may be guided to perform one or more tasks and avoid one or more obstacles or obstructions according to an exemplary embodiment of the invention; and FIG. 8 is a flowchart of a method for determining a path or route in which a robot may be guided to perform one or more tasks according to an exemplary embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

General System Architecture

Reference is now made to FIG. 1, which is a block diagram of a system according to an exemplary embodiment. As shown in FIG. 1, the system may include a robot 175 which may access one or more entities such as, for example, communication device 145 (e.g., servers, personal computers, laptops, workstations, personal digital assistants, smart devices, etc.), or any other suitable entity. As described above, "robot" may include all or part of an automated or semi-automated machine or apparatus that may be used to perform tasks throughout an automated environment. In one embodiment, the robot 175 may access the communication device 145 over a network 140, such as a wired local area network (LAN), or a wireless local area network (WLAN), a metropolitan network (MAN) and/or a wide area network (WAN) (e.g., the Internet). In this regard, the communication device 145 may be capable of receiving data from and transmitting data to the robot 175. Additionally or alternatively, the communication device 145 may communicate with the robot 175 in accordance with a short range communication 100 or Near Field Communication (NFC) such as, for example, Radio Frequency (RF), Bluetooth (BT), Infrared (IR) or the like.

The communication device 145 may also communicate with a Near Field Communication (NFC) reader 150 (e.g., an RFID reader). In this regard, the communication device 145 may receive data from and transmit data to the NFC reader 150 via network 140. Additionally or alternatively, the NFC reader 150 may communicate with the communication device 145 when the NFC reader 150 is within a given proximity, range or distance of the communication device 145 via a short range communication 105 or Near Field Communication (NFC) such as, for example, Radio Frequency (RF), Bluetooth (BT), Infrared (IR) or the like.

The NFC reader 150 may send one or more interrogation signals to the NFC tags 28 (e.g., RFID tags) when the NFC reader 150 is within a proximity, range or distance of the NFC tags 28. The interrogation signals may excite or trigger the NFC tags 28 to send data (e.g., RF data to the NFC reader 150. The data received by the NFC reader 150 from the NFC tags 28 may, but need not, be utilized to determine a location(s) corresponding to each of the respective NFC tags. The NFC reader 150 may send this data to the communication device 145 and the communication device 145 may send the data to the robot 175 along with information identifying a path or route for the robot 175 to utilize in accessing one or more targets corresponding to the locations and/or identifying obstructions or areas to avoid corresponding to the locations, as described more fully below.

It should be pointed out that although the system of FIG. 1 shows one robot 175, one communication device 145, one NFC reader 150 and three NFC tags 28, the system of FIG. 1 may include any suitable number of robots 175, communication devices 145, NFC readers 150 and NFC tags 28 without departing from the spirit and scope of the invention. In addition, while shown as separate entities, as one of ordinary skill in the art will recognize in light of this disclosure, the functionality described herein of the communication device 145 and robot 175 may be performed by a single entity.

Communication Device

FIG. 2 illustrates a block diagram of a communication device according to an exemplary embodiment of the invention. The communication device 145 may, but need not, be an entity such as for example, a specifically-configured server, computer, workstation, smart device or the like. In an exemplary embodiment, the communication device 145 may be a network entity. The communication device 145 includes various means for performing one or more functions in accordance with exemplary embodiments of the invention, including those more particularly shown and described herein. It should be understood, however, that the communication device may include alternative means for performing one or more like functions, without departing from the spirit and scope of the invention. More particularly, for example, as shown in FIG. 2, the communication device may include a processor 70 connected to a memory 86. The memory 86 may comprise volatile and/or non-volatile memory, and typically stores content (e.g., media content), data, information or the like.

For example, the memory 86 may store content transmitted from, and/or received by, the communication device. In an exemplary embodiment, the memory 86 may store one or more applications, software, or the like as well as any other suitable information. The memory 86 may also store data associated with locations corresponding to NFC tags 28. The locations may be utilized by the communication device 145 to instruct the robot 175 to perform a task(s) at one or more of the locations, perform one or more tasks along a route corresponding to the locations and/or avoid one or more areas corresponding to the locations. Also, for example, the memory 86 typically stores client applications, instructions or the like for execution by the processor 70 to perform steps associated with operation of the communication device in accordance with embodiments of the invention. As explained below, for example, the memory 86 may store one or more client application(s) such as for example software (e.g., computer code).

The processor 70 may be embodied in a variety of ways. For instance, the processor 70 may be embodied as a controller, coprocessor, microprocessor of other processing devices including integrated circuits such as for example an application specific integrated circuit (ASIC), a field programmable gate array (FPGA). In an exemplary embodiment, the processor may execute instructions stored in the memory 86 or otherwise accessible to the processor 70.

The communication device 145 may include one or more logic elements for performing various functions of one or more client application(s). In an exemplary embodiment, the communication device 145 may execute the client application(s). The logic elements performing the functions of one or more client applications may be embodied in an integrated circuit assembly including one or more integrated circuits (e.g., an ASIC, FPGA or the like) integral or otherwise in communication with a respective network entity (e.g., computing system, client, server, etc.) or more particularly, for example, a processor 70 of the respective network entity.

In addition to the memory 86, the processor 70 may also be connected to at least one interface or other means for displaying, transmitting and/or receiving data, content or the like. The interface(s) can include at least one communication interface 88 or other means for transmitting and/or receiving data, content or the like. In this regard, the communication interface 88 may include, for example, an antenna (or multiple antennas) and supporting hardware and/or software for enabling communications with a wireless communication network. For example, the communication interface(s) may include a first communication interface for connecting to a first network, and a second communication interface for connecting to a second network. In this regard, the communication device is capable of communicating with other electronic devices (e.g., robot 175 and NFC reader 150) over one or more networks (e.g., network 140) such as a Local Area Network (LAN), wireless LAN (WLAN), Wide Area Network (WAN), Wireless Wide Area Network (WWAN), the Internet, or the like. Alternatively, the communication interface can support a wired connection with the respective network.

The communication device 145 may also include one or more means for sharing and/or obtaining data. For example, the communication device 145 may comprise a short range radio frequency (RF) transceiver and/or interrogator 20 so data may be shared with and/or obtained from electronic devices in accordance with RF techniques. The communication device 145 may comprise other short range transceivers, such as, for example an infrared (IR) transceiver 22, a Bluetooth™ (BT) transceiver 24 operating using Bluetooth™ brand wireless technology developed by the Bluetooth™ (BT) Special Interest Group, and/or the like. The Bluetooth transceiver 24 may be configured to operate according to Wibree™ radio standards. In this regard, the communication device 145 and, in particular, the short range transceiver may be capable of transmitting data to and/or receiving data from electronic devices (e.g., NFC reader 150, robot 175) within a proximity of the communication device 145, such as within 10 meters, for example or any other suitable distance or range.

In addition to the communication interface(s), the interface(s) may also include at least one user interface that may include one or more earphones and/or speakers, a display 80, and/or a user input interface 77. The user input interface, in turn, may comprise any of a number of devices allowing the entity to receive data from a user, such as a microphone, a keypad, keyboard, a touch display, a joystick, image capture device, pointing device (e.g., mouse), stylus or other input device.

In an exemplary embodiment, the processor 70 may be in communication with and may otherwise control a robot controller 78. The robot controller 78 may be any means such as a device or circuitry operating in accordance with software or otherwise embodied in hardware or a combination of hardware and software thereby configuring the device or circuitry (e.g. a processor or controller) to perform the corresponding functions of the robot controller 78 as described below. In examples in which software is employed, a device or circuitry (e.g., processor 70 in one example) executing the software forms the structure associated with such means. As such, for example, the robot controller 78 may be configured to provide, among other things, means for instructing a robot to perform a task(s) at one or more locations along a route or to avoid one or more areas, locations or objects (also referred to herein interchangeably as "obstacles" or "obstructions"), as described more fully below.

In one exemplary embodiment, the communication device 145 may be a standalone device. As described above, in an alternative exemplary embodiment, the communication device 145 may be embodied within or as part of the robot 175.

NFC Reader

Referring now to FIG. 3, an exemplary embodiment of an NFC reader is provided. The NFC reader 150 may include one or more means for sharing and/or obtaining data. For example, the NFC reader 150 may comprise a NFC module 32 that includes a short range radio frequency (RF) transceiver and/or interrogator 26 so data may be shared with and/or obtained from electronic devices in accordance with RF techniques. The NFC reader 150 may comprise other short range transceivers, such as, for example an infrared (IR) transceiver 29, a Bluetooth™ (BT) transceiver 30 operating using Bluetooth™ brand wireless technology developed by the Bluetooth™ Special Interest Group, and/or the like. The Bluetooth transceiver 30 may be configured to operate according to Wibree™ radio standards. The NFC reader 150 and, in particular, the NFC module 32 may be capable of transmitting data to and/or receiving data from electronic devices (e.g., NFC tags, transponders, etc.) within a proximity, range or distance of the NFC reader 150, such as within 10 meters, for example. However, the NFC module 32 may be capable of transmitting data to and/or receiving data from electronic devices (e.g., NFC tags 28, communication device 145) within other suitable proximities such as, for example, 20 centimeters, etc. Additionally or alternatively, the NFC reader 150 may be configured to transmit and/or receive data from electronic devices according to various wireless networking techniques, including Wireless Fidelity (Wi-Fi), WLAN techniques such as IEEE 802.11 techniques (e.g., across network 140), and/or the like. Additionally, it should be pointed out that in an example embodiment, the NFC module 32 may be capable of reading and receiving a short-range communication or Near Field Communication upon interrogation by the NFC reader of a device (e.g., NFC tags 28).

In an example embodiment, the NFC reader 150 may read NFC data from a device (e.g., NFC tags, transponders, etc.) when the NFC reader 150 is within a proximity of the device(s). The NFC data may be provided by the NFC reader 150 to the communication device 145 which may utilize the NFC data, in part, to instruct a robot 175 regarding the manner in which to access a location corresponding to a NFC tag(s) 28 to perform a task(s) along a route for performing one or more tasks or to avoid one or more areas or objects corresponding to locations associated with the NFC tags 28, as described more fully below.

The NFC reader 150 may also include a processor 34 and an associated memory 36. The memory 36 may comprise volatile and/or non-volatile memory, and may store content, data and/or the like. For example, the memory may store content, data, information, and/or the like transmitted from, and/or received by, the NFC reader. In this regard, the memory 36 may store data received by the NFC reader 150 from one or more NFC tags 28. The data received from the corresponding NFC tags may be utilized to determine location data identifying locations of the NFC tags 28. Also, for example, the memory 96 may store client applications, instructions, and/or the like for the processor 34 to perform the various operations of the NFC reader in accordance with embodiments of the invention, as described herein.

In addition to the memory 36, the processor 34 may also be connected to at least one interface or other means for transmitting and/or receiving data, content, and/or the like. In this regard, the interface(s) may comprise at least one communication interface 38 or other means for transmitting and/or receiving data, content, and/or the like. In an example embodiment, the communication interface 38 may be configured to communicate information across network 140. In an alternative exemplary embodiment, the NFC reader 150 may be embodied within the communication device 145.

NFC Tags

Referring now to FIG. 4, an example embodiment of an NFC tag is provided. In one embodiment, the NFC tag 28 (e.g., a RFID tag/chip, a BT chip and/or the like) may be embodied in a NFC key 35 (also referred to herein as RFID key 35). The NFC key 35 may, but need not, be any suitable physical object with which a robot (e.g., all or part of an automated or semi-automated machine or apparatus) may interact in performance of a task. This may include, for example, a vial, a container, a cup, a bottle, a car part, and/or any possible object or component used in conjunction with performance of a task by the robot. In an example embodiment, one or more NFC tags 28 may be associated with the NFC key 35 (e.g., incorporated within, attached thereto, etc.). As described in more detail below, in one embodiment, the number of NFC tags 28 associated with the NFC key 35 may depend upon the number of degrees of dexterity or freedom in which the robot is capable of moving. The NFC tag 28 (also referred to herein as transponder 28 or NFC transponder 28) may include a transceiver such as a short range transceiver 83 having an antenna 81. The NFC tag 28 may also include a processor 84 and a memory 82. The short range transceiver 83 may be configured to operate in accordance with one or more frequencies or one or more frequency bands. Additionally, the short range transceiver 83 may communicate with other electronic devices such as, for example, the NFC reader 150 as well as other electronic devices. In this regard, the short range transceiver 83 may communicate with other electronic devices according to RF, BT, IR or any other suitable short range or Near Field Communication techniques. The short range transceiver 83 may communicate with the NFC reader 150 when the NFC reader 150 is within a given proximity, range or distance of the NFC tag 28. In this regard, the short range transceiver 83 may send one or more interrogation signals to a respective NFC module 32 of the NFC reader 150 when the NFC reader 150 is within the proximity of the NFC tag 28. The interrogation signals may excite or trigger the NFC module 32 to read data (e.g., RF/NFC data signals) from the NFC tag 28.

The memory 82 may store one or more instructions (e.g., programs) associated with one or more applications, unique identifiers (IDs) as well as any other suitable data. It should be pointed out that when the NFC module 32 reads the NFC tag 28, the NFC tag 28 may send information associated with NFC data (e.g., a unique ID(s)) stored in memory 82 to the NFC reader 150 and the sent information may be utilized in part to determine location data indicating a location corresponding to the NFC tag 28. The location data may include one or more coordinates such as, for example, an x-coordinate, a y-coordinate, a z-coordinate or any other suitable coordinates. The processor 84 may be a controller or other processing element configured to execute instructions, which may be stored in memory 82 or perform other logical operations or functions of the NFC tag 28 as described herein. The processor 84 may be embodied as an ASIC or an FPGA.

Computing Device

Referring now to FIG. 5, a block diagram of a computing device that may, but need not, be embodied in the robot 175 according to an exemplary embodiment is provided. As shown in FIG. 5, the computing device 170 may include a processor 44 connected to a memory device 46. The memory device 46 (also referred to herein as memory 46) may comprise volatile and/or non-volatile memory, and may store content, information, data or the like. For example, the memory device 46 typically stores content transmitted from, and/or received by, the computing device 170. In this regard, the memory 46 may store data received from the robot controller 78 of the communication device 145. Additionally, the memory device 46 may store client applications, software, software code (e.g., computer code), algorithms, instructions or the like for the processor 44 to perform steps associated with operation of the computing device 170.

The processor 44 may be connected to at least one communication interface 48 or other means for displaying, transmitting and/or receiving data, content, information or the like. In this regard, the communication interface 48 may be capable of connecting to one or more networks (e.g., network 140). The processor 44 may receive data from the robot controller 78 instructing the robot 175 to perform a task(s) at a location, perform one or more tasks along a route corresponding to one or more locations, or avoid one or more areas, locations or objects. The computing device 170 may also include at least one user input interface 42 that may include one or more speakers, a display, and/or any other suitable devices. For instance, the user input interface 42 may include any of a number of devices allowing the computing device 170 to receive data from a user, such as a keyboard, a keypad, mouse, a microphone, a touch screen display, or any other input device.

Additionally, the computing device 170 may comprise a short range radio frequency (RF) transceiver and/or interrogator 90 so data may be shared with and/or obtained from electronic devices in accordance with RF techniques. The computing device 170 may also comprise other short range transceivers, such as, for example an infrared (IR) transceiver 92, a Bluetooth™ (BT) transceiver 94 operating using Bluetooth™ brand wireless technology developed by the Bluetooth™ Special Interest Group, and/or the like. The Bluetooth transceiver 94 may operate according to Wibree™ radio standards. The computing device 170 and, in particular, the short range transceiver may be capable of transmitting data to and/or receiving data from electronic devices (e.g., communication device 145) within a proximity of the computing device 170, such as within 10 meters, for example or any other suitable range or distance (e.g., 30 feet).

Exemplary System Operation

Reference will now be made to FIGS. 6 & 7, which shows a system and method, respectively, for enabling a robot (e.g., all or part of an automated or semi-automated machine or apparatus) to access one or more targets along a route and/or to avoid areas identified as obstacles according to exemplary embodiments of the invention. In this regard, the exemplary embodiments provide an efficient and reliable manner in which to teach a robot positions or locations for accessing targets along a route. As such, the exemplary embodiments provide an operator with a fast, efficient and reliable mechanism in which to acquire robot target locations or areas to avoid without actually guiding the robot to each location or area in advance of generating a route. In this manner, the impact of colliding with expensive or important support architecture and equipment in an automated environment is minimized.

Referring now to FIG. 6, an exemplary embodiment of a system is provided for determining a path or route in which a robot may be guided to perform one or more tasks and/or for avoiding one or more obstacles or obstructions. For purposes of illustration and not of limitation, the following example embodiment involves a robot 175 operating in an automated environment to automatically fill vials, containers or the like at specific locations (e.g., targets) with medications. These locations may correspond to locations along a path or route. It should be pointed out that the robot may perform any suitable automated functions or tasks (e.g., welding, painting, component assembly, etc.) without departing from the spirit and scope of the invention. In order to perform functions or tasks in an automated environment, a route may be generated specifying a path in which a robot may be routed to access locations in which to perform functions or tasks. Additionally, it may be desirable for the robot 175 to avoid areas or objects along the path such as, for example, to minimize the impact of a collision(s) or for any other suitable reason.

In the exemplary system of FIG. 6, one or more NFC tags 28 may be utilized in part to determine positions of targets and/or obstructions. These NFC tags 28 may be included in an NFC key 35. For instance, the NFC tags 28 may be embodied or mounted within the NFC key 35 and the NFC tags 28 may be utilized to record all targets and/or obstructions. In an exemplary embodiment, the NFC key 35 may include a number of NFC tags 28 corresponding to one or more degrees of freedom or dexterity associated with the robot. For example, three NFC tags may be included in an NFC key 35 in an instance in which a robot 175 is capable of moving in three different directions (e.g., along the x, y and z axes).

Although FIG. 6 shows three NFC tags 28 included in the NFC key 35, it should be pointed out that any suitable number of NFC tags may be included in the NFC key 35. For instance, in an instance in which the robot 175 is only able to move up and down, a single NFC tag 28 may be used. Alternatively, a robot that is capable of rotating and moving up or down may use two NFC tags 28 (e.g., one for angle and one for elevation). Similarly, according to one embodiment, a robot 175 capable of moving in, for example, 10 or 12 different orientations (e.g., having 10 or 12 different degrees of freedom) may use a corresponding 10 or 12 NFC tags 28.

It should be pointed out that the NFC key 35 may be any suitable physical object that the robot 175 may be capable of handling. In an example embodiment, the NFC key 35 may be a physical object (e.g., a cup, container, bottle, bag, etc.) that the robot 175 may utilize while performing one or more automated tasks or functions.

In order to determine the origin locations of the NFC tags 28, a user 40 such as, for example, an operator or the like, may place the NFC key 35 directly into an end effector 39 (also referred to herein as receptacle 39) of the robot 175. For example, as shown, where the robot has a robot arm that may be performing the task (e.g., filling vials at certain locations), the NFC key 35 (e.g., in the shape of a vial) may first be inserted directly into the robotic arm while the arm is in a home or origin position. When the NFC reader 150 is within a proximity (e.g., 30 feet) of the robot 175, the NFC reader 150 may read data from the NFC tags and may determine an origin location of the robot 175 based on the position of the NFC tags 28 in response to placing or inserting the NFC key 35 into the end effector 39. In one exemplary embodiment, when the NFC key 35 is inserted into the end effector 39, the NFC reader 150 may read data from the NFC tags and may determine an origin location of the robot 175 based on the position of the NFC tags in response to powering up the robot 175.

The NFC reader 150 may determine the location of the NFC tags 78 based in part on the signal strengths received from the respective NFC tags 28. For example, when the received signal strength is strong, the NFC reader 150 may determine that the location of the NFC tags is closer to the NFC reader 150. On the other hand, when the received signal strengths are weak, the NFC reader 150 may determine that the NFC tags are farther away from the NFC reader 150. In one embodiment, the processor 44 of the computing device 170 in the robot 175 may know the current location of the robot 175 and may send data associated with the current location to the NFC reader 150. For instance, the processor 44 may implement a global positioning system (GPS) feature to determine the location of the robot 175 and may send this location information to the NFC reader 150. In one alternative exemplary embodiment, the NFC reader 150 may send raw data that the NFC reader 150 may receive from the NFC tags 28 and/or the computing device 170 to the communication device 145 and the robot controller 78 may determine the locations of the NFC tags 28 and the robot 175 based in part on the information.

The information identifying the origin location of the robot 175 and the origin locations of the NFC tags 28 that are received by the NFC reader 150 may be stored in memory 36 of the NFC reader 150 by the processor 34. Once the originating locations are saved by the NFC reader 150, the user (e.g., the operator) may remove the NFC key 35 from the end effector 39 and may insert the NFC key 35 into one or more targets 41, 43, 45, each located at a position to which the robot may perform a task to teach the robot 175 those locations. In an example embodiment, the user may select a setting of a device (not shown) to capture one or more locations. Once the user selects the setting of the device to capture the locations, the user 40 may insert the NFC key 35 in a target 41 corresponding to a first location that the robot 175 is to access. In this regard, the user 40 may press a button (not shown) (also referred to herein as a switch) or the like of the device to trigger the NFC module 32 of the NFC reader 150 to read data (e.g., a unique identifier(s)) associated with the NFC tags 28 to determine the first location corresponding to the target 41. The first location may be determined by the processor 34 based on the signal strength of the data read by the NFC module 32 from the NFC tags 28 in the NFC key 35 in the manner described above. In an alternative exemplary embodiment, the processor 34 may determine the location based on the power levels between each antenna 81 of the NFC tags 28 as measured by the NFC module 32. In this regard, the power level for each NFC tag 28 may rise the closer a respective NFC tag 28 is to the NFC reader 150. On the other hand, the power level may fall as the respective NFC tag 28 is moved away from the NFC reader 150. The processor 34 or the robot controller 78 may be capable of interpreting the power level data measured by the NFC module 32 and determine a discrete location for each NFC tag 28. It should be pointed out that any other suitable mechanism for determining the location of NFC tags may be utilized by the exemplary embodiments without departing from the spirit and scope of the invention.

It should be pointed out that the data associated with the first location may be read by the NFC module 32 from the NFC tags 28 when the NFC reader 150 is within a proximity of the NFC key 35 that is inserted in target 41. The processor 34 may store the location associated with the target 41 in the memory 36. Next, the user 40 may remove the NFC key 35 from the target 41 and insert the NFC key 35 in the target 43. Once the NFC key 35 is inserted in the target 43, the user 40 may select the button of the device which may trigger the NFC module 32 to read data (e.g., a unique identifier(s)) of the NFC tags 28 within the NFC key 35 so that the processor 34 may utilize the data to determine a second location that the robot 175 is to access. The processor 34 may store the data associated with the second location in the memory 36.

Subsequently, the user 40 may remove the NFC key 35 from the target 43 and may insert the NFC key 35 in the target 45. When the NFC key 35 is inserted in the target 45, the user 40 may select the button of the device to trigger the NFC module 32 to read data of the NFC tags 28. Upon receipt of the data from the NFC tags 28, the processor 34 may utilize the data to determine a third location that the robot 175 is to access. The processor 34 of the NFC reader 150 may facilitate storage of this data associated with the third location in the memory 36.

Although the example embodiment of FIG. 6 shows three targets 41, 43, 45 that may be utilized for determining locations for the robot 175 to access, it should be pointed out that any suitable number of targets may be included in the system of FIG. 6 for facilitating the teaching of the locations along a path to the robot 175. In this regard, the locations may include any suitable number of locations and are not limited to three locations. In particular, the number of targets may correspond to the total number of possible locations at which the robot may perform a task.

Once the NFC reader 150, or alternatively the robot controller 78, determines all of the locations in the manner described above, the user 40 may select a setting of a device (not shown) to assign areas, locations, or objects for the robot 175 to avoid. In this regard, the user 40 may utilize one or more additional targets (e.g., targets 51, 53) to facilitate determination of a location(s), area(s) or object(s) that the robot 175 should avoid. For purposes of illustration and not of limitation, the user 40 may place the target 51 at a physical location which may be on an object(s) and may insert the NFC key 35 in the target 51. In an example embodiment, the target may be a location in space, such as, for example, a weld location or a paint location or any other suitable location. For purposes of illustration and not of limitation, the NFC key 35 may be placed at a location, such as for example, on the edge of a table (or a floor) and when the position of the table (or the floor) is recorded, the corresponding location may denote the target. As another example, some targets may correspond to a location of a hole in an instance in which the NFC key 35 is inserted into a cylinder while other targets may correspond to a center of roof of a car where a robot is to paint. In this example, the NFC key 35 may be placed on the roof and the position of the roof may be recorded as denoting the target.

In response to the user placing the target 51 at a location and inserting the NFC key 35 in the target, the user 40 may select the button of the device which may trigger the NFC module 32 of the NFC reader 150 to read data of the NFC tags 28. Upon receipt of the data from the NFC tags 28 by the NFC reader 150, the processor 34 may determine the location associated with the NFC tags 28 in a manner analogous to that described above. The processor 34 of the NFC reader 150 may define or assign the location as an obstacle or obstruction denoting that the robot 175 should be instructed to avoid the corresponding location. The processor 34 may facilitate storage of the data regarding the assignment in the memory 36.

As another example, the user 40 may place the target 53 at another physical location and may insert the NFC key 35 in the target 53. In this manner, the user may select a button (not shown) of a device (not shown) to trigger the NFC module 32 to read the data of the NFC tags 28. In response to receipt of the data from the tags, the processor 34 may determine the location corresponding to the NFC tags 28 of the NFC key 35 that is inserted in target 53. The processor 34 may assign this location as another obstacle or obstruction denoting that the robot 175 is to be instructed to avoid the respective location. The data regarding the assignment may be stored by the processor 34 in the memory 36.

Once the location information corresponding to the locations at which the robot 175 is to perform a task(s) or function(s) and/or the location information associated with locations that the robot 175 are to avoid are all stored in the memory 36, the processor 34 may send the location information to the communication device 145. Additionally, the processor 34 of the NFC reader 150 may provide the data relating to the origin location of the robot 175 and the original locations of NFC tags 28 that were inserted in the end effector 39 of the robot 175 to the communication device 145. In response to receipt of information associated with the origin location of the robot 175, the original locations of the NFC tags 28 and the location information associated with each target and obstacle, the robot controller 78 of the communication device 145 may, in one embodiment, calculate one or more best routes (also referred to herein as best paths) for the robot to move about in an automated environment and perform one or more tasks (e.g., filling vials of medicine, etc.) at specified locations. The route(s) may include, for example, a route from the origin location to each of the target locations. Alternatively, or in addition, the route(s) may include a route between multiple targets. The best route may be determined by the robot controller 78 based on implementing a GPS feature with respect to the location information provided by the NFC reader 150. Alternatively, the best route may be determined by the robot controller 78 based on data received from one or more motor encoders of the robot 175. For instance, the robot 175 may determine its location based on feedback from one or more of the motor encoders that provided the robot with data relating to the location of one or more parts (e.g., an automated arm) of the robot 175 and the range of motion of the parts. This location data may be provided by the robot 175 to the robot controller 78 such that the robot controller 78 may utilize the location information to determine the best route.

The data associated with the best route(s) may be sent by the robot controller 78 to the processor 44 of the computing device 170 maintained in the robot 175. The processor 44 may evaluate data associated with the best route(s) and may instruct the robot 175 to move about and operate in an automated environment according to the best route(s). In this exemplary embodiment, the robot 175 may be guided by the processor 44 to one or more locations for performing a task(s) or function(s) as defined by the best route(s) and the robot 175 may avoid locations, or areas assigned as an obstacle(s) or obstruction(s). It should be pointed out that in embodiments in which the communication device 145 is embodied within the robot 175, the robot controller 78 may instruct the robot 175 to move about and operate in the automated environment according to the best route(s) without communicating with the processor 44.

In another embodiment, the robot controller 78 may send only the location information (e.g., origin, target and obstacle location information), and not the best route(s), to the processor 44. In this embodiment, the robot controller 78 or the processor 44 of the computing device 170 maintained in the robot 175 may calculate the best route(s) at some later point in time. For example, the processor 44 may calculate the best route to perform one or more tasks in real-time in response to receiving instructions to perform the task(s). As a more specific example, a robot used to dispense medications may calculate the best route for the robotic arm to take in order to gather the medications in response to receiving instructions that include the specific medications to be dispensed.

In the exemplary embodiment of FIG. 6, the NFC reader 150 may send the origin location of the robot 175, the original locations of the NFC tags 28 and other location information relating to targets or obstructions to the communication device 145 together as a batch. However, in an alternative exemplary embodiment, the NFC reader 150 may provide this data to the communication device 145 as the data is received from one or more NFC tags 28 or the robot 175. For example, in an instance in which the NFC module 32 receives data read from an NFC tag 28 at a particular location, the processor 34 of the NFC reader 150 may send corresponding location information associated with the NFC tag 28 to the communication device 145 without waiting on the NFC module 32 to receive data read from NFC tags 28 inserted at other targets.

In some exemplary embodiments, the user 40 may have decided not to select areas, locations or obstructions for the robot 175 to avoid. In these exemplary embodiments, the robot 175 may move about an automated environment according to the best route without respect to any information instructing the robot 175 to avoid any obstacles or obstructions. In one or more other exemplary embodiments, the user may decide to utilize the setting of a device (not shown) to define one or more areas, locations or objects to avoid but may decide not to select locations for the robot 175 to perform tasks along a route. In this regard, the processor 44, or alternatively the robot controller 78, may instruct the robot 175 to avoid the areas, locations, or objects when the robot 175 is moved about an automated environment.

Referring now to FIG. 7, a flowchart of an exemplary method is provided for determining a path or route in which a robot may be guided to perform one or more tasks and/or avoiding one or more obstacles or obstructions. At operation 700, an apparatus (e.g., communication device 145) may receive location information from a device (e.g., the NFC reader 150). Optionally, at operation 705, at least one apparatus (e.g., communication device 145 and/or NFC reader 150) may determine that the received location information is based in part on receipt of data via one or more Near Field Communications. Optionally, at operation 710, an apparatus (e.g., communication device 145) may specify one or more areas, locations or objects that the robot is to avoid along the route based in part on receipt of additional location information corresponding to detected locations associated with other locations of the Near Field Communication devices.

At operation 715, an apparatus (e.g., communication device 145) may determine a route based on the received location information in which the route specifies a path that a robot is to travel for performing one or more tasks at determined locations corresponding to locations of Near Field Communication devices. At operation 720, at least one apparatus (e.g., communication device 145 or computing device 170) may instruct the robot to travel within an environment based on the determined route.

Referring now to FIG. 8, a flowchart of an exemplary method is provided for determining a path or route in which a robot may be guided to perform one or more tasks. At operation 800, an apparatus (e.g., communication device 145) may receive origin location information via a Near Field Communication (NFC) tag associated with a key in an instance in which the key is positioned in an origin location. At operation 805, an apparatus (e.g., communication device 145) may receive target location information via the NFC tag associated with the key in an instance in which the key is positioned in a target location, at which a task is performed by a robot (e.g., robot 175). At operation 810, an apparatus (e.g., communication device 145) may generate a route for the route to traverse in order to complete the task based in part on the origin location information and the target location information.

It should be pointed out that FIGS. 7 and 8 are flowcharts of a system, method and computer program product according to exemplary embodiments of the invention. It will be understood that each block or step of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 86, memory 46, memory 36) and executed by a processor (e.g., processor 70, processor 44, processor 34, robot controller 78). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowcharts blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts blocks or steps.

Accordingly, blocks or steps of the flowcharts support combinations of means for performing the specified functions and combinations of steps for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In an exemplary embodiment, an apparatus for performing the methods of FIGS. 7 and 8 above may comprise a processor (e.g., the processor 70, the processor 44, the processor 34) configured to perform some or each of the operations described above. The processor may, for example, be configured to perform the operations by performing hardware implemented logical functions, executing stored instructions, or executing algorithms for performing each of the operations. Alternatively, the apparatus may comprise means for performing each of the operations described above. In this regard, according to an example embodiment, examples of means for performing operations may comprise, for example, the processor 34, the processor 44, the processor 70 (e.g., as means for performing any of the operations described above), the robot controller 78 and/or a device or circuit for executing instructions or executing an algorithm for processing information as described above.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving origin location information via a Near Field Communication (NFC) tag associated with a key in an instance in which the key is positioned in an origin location;
   receiving target location information via the NFC tag associated with the key in an instance in which the key is positioned in a target location, at which a task is performed by a robot; and
   generating, via a processor, a route for the robot to traverse in order to complete the task based in part on the origin location information and the target location information.

2. The method of claim 1, wherein receiving the origin location information and the target location information further comprises receiving the origin location information and the target location information via a NFC reader in an instance in which the NFC reader is within proximity of the NFC tag.

3. The method of claim 1, wherein the NFC tag comprises a Radio Frequency Identification (RFID) tag and wherein the NFC reader comprises an RFID reader.

4. The method of claim 1, wherein receiving the origin location information and the target location information further comprises receiving the origin location information and the target location information via two or more NFC tags associated with the key.

5. The method of claim 1, wherein the key corresponds to an object on or with which the robot performs the task.

6. The method of claim 1, further comprising:

receiving obstacle location information via the NFC tag associated with the key in an instance in which the key is positioned in proximity of an obstacle, wherein the obstacle location information is used, in part, to generate the route.

7. The method of claim 1, further comprising:

receiving target location information for each of a plurality of target locations at which the robot performs one or more tasks, wherein the target location information is received via the NFC tag associated with the key in an instance in which the key is positioned at each target location.

8. The method of claim 4, wherein a number of the NFC tags corresponds to a number of degrees of freedom associated with the robot.

9. The method of claim 7, wherein the target location information for one or more of the target locations is used, in part, to generate the route for the robot to traverse in order to complete at least one task at each of the one or more target locations.

10. A computer program product comprising at least one non-transitory computer-readable storage medium having computer-executable program code instructions stored therein, the computer executable program code instructions comprising:

program code instructions configured to cause receipt of origin location information via a Near Field Communication (NFC) tag associated with a key in an instance in which the key is positioned in an origin location;

program code instructions configured to cause receipt of target location information via the NFC tag associated with the key in an instance in which the key is positioned in a target location, at which a task is performed by a robot; and program code instructions configured to generate a route for the robot to traverse in order to complete the task based in part on the origin location information and the target location information.

11. The computer program product of claim 10, wherein receipt of the origin location information and the target location information further comprises causing receipt of the origin location information and the target location information via a NFC reader in an instance in which the NFC reader is within proximity of the NFC tag.

12. An apparatus comprising:
at least one memory; and
at least one processor configured to cause the apparatus to:
receive origin location information via a Near Field Communication (NFC) tag associated with a key in an instance in which the key is positioned in an origin location;
receive target location information via the NFC tag associated with the key in an instance in which the key is positioned in a target location, at which a task is performed by a robot; and
generate a route for the robot to traverse in order to complete the task based in part on the origin location information and the target location information.

13. The apparatus of claim 12, wherein receive the origin location information and the target location information further comprises receiving the origin location information and the target location information via a NFC reader in an instance in which the NFC reader is within proximity of the NFC tag.

14. The apparatus of claim 12, wherein the NFC tag comprises a Radio Frequency Identification (RFID) tag and wherein the NFC reader comprises an RFID reader.

15. The apparatus of claim 12, wherein receive the origin location information and the target location information further comprises receiving the origin location information and the target location information via two or more NFC tags associated with the key.

16. The apparatus of claim 12, wherein a number of the NFC tags corresponds to a number of degrees of freedom associated with the robot.

17. The apparatus of claim 12, wherein the key corresponds to an object on or with which the robot performs the task.

18. The apparatus of claim 12, wherein the processor is further configured to cause the apparatus to:
receive obstacle location information via the NFC tag associated with the key in an instance in which the key is positioned in proximity of an obstacle, wherein the obstacle location information is used, in part, to generate the route.

19. The apparatus of claim 12, wherein the processor is further configured to cause the apparatus to:
receive target location information for each of a plurality of target locations at which the robot performs one or more tasks, wherein the target location information is received via the NFC tag associated with the key in an instance in which the key is positioned at each target location.

20. The apparatus of claim 19, wherein the target location information for one or more of the target locations is used, in part, to generate the route for the robot to traverse in order to complete at least one task at each of the one or more target locations.

* * * * *